RECORDERS

Filed Aug. 19, 1953 3 Sheets-Sheet 1

INVENTORS.
ROBERT P. BISHOP,
GEORGE BRUCK,
PARKER PAINTER, JR.
GEORGE S. SHAW
BY
Hyman Hurwitz
Atty.

June 18, 1957 R. P. BISHOP ET AL 2,796,314

RECORDERS

Filed Aug. 19, 1953 3 Sheets-Sheet 2

*INVENTORS.*
ROBERT P. BISHOP,
GEORGE BRUCK,
BY PARKER PAINTER, JR.
GEORGE S. SHAW

Hyman Hurvitz
atty.

June 18, 1957 R. P. BISHOP ET AL 2,796,314

RECORDERS

Filed Aug. 19, 1953 3 Sheets-Sheet 3

INVENTORS.
ROBERT P. BISHOP,
BY GEORGE BRUCK,
PARKER PAINTER, JR.
GEORGE S. SHAW

United States Patent Office 2,796,314

Patented June 18, 1957

2,796,314

RECORDERS

Robert P. Bishop, George Bruck, Parker Painter, Jr., and George S. Shaw, Melbourne, Fla., assignors to Radiation, Inc., Melbourne, Fla., a corporation of Florida Application August 19, 1953, Serial No. 375,238

11 Claims. (Cl. 346—33)

The present invention relates generally to analog to digital computers, and more particularly to devices for providing an output signal in a channel selected in accordance with the magnitude of an input signal.

In one preferred application of the present invention, it is desired to record the magnitude of a variable voltage. The recorder employed may be of the voltage sensitive type, employing a voltage sensitive recording tape and a plurality of stationary recording styli, each connected in one output channel of an analog to digital computer. The analog to digital computer serves to channel a signal into that one or ones of the output channels which correspond with the magnitude of the variable voltage.

The operation of the system in accordance with the invention requires amplitude comparison of a variable voltage and a stair step wave, in an amplitude comparator. When the amplitude of the variable voltage is identical with the amplitude of the stair step wave a gating pulse is generated by the comparator. The stair step wave itself is generated in response to the output of a synchronizing oscillator, each cycle of which adds one step to the wave. The synchronizing oscillator also drives a counter string, having output channels which are partially gated on in succession, as the count proceeds. The gating pulse provided by the comparator is commonly applied to the counters, and serves to complete the gating operation. That channel only is gated fully on which is supplied with a gating pulse from the amplitude comparator at the same time that it is partially gated on by the counter string.

The counter string may contain a plurality of cascaded counters, and specifically one may be employed to count units and another to count tens. In such case, one counter element of each of the counters will be gated on simultaneously, to permit a count between 1 and 100, and an output channel may be supplied for each element of the units counter and each element of the tens counters. In all, then, twenty output channels, and twenty styli, may be employed, to represent numerically the tens and units of a measured magnitude.

The oscillator above referred to may be a free running multivibrator having square wave output. The stair step generator may be activated in response to the leading edge of the square wave, and the counter string from the trailing or falling edge. This alternate operation provides sufficient time for gates to open before the stair step generator steps. Since the counter advances one step, and the stair step generator rises one step, for each cycle of the oscillator, it is not essential that the oscillator be stable in frequency.

At the end of a count of 100, the stair step generator is discharged, to recommence its cycle of operations. During the interval of time required for the discharge, the oscillator must be disabled, and when it recommences operation it must start off with a positive pulse or rising edge. The disabling function is accomplished in response to a pulse, generated by the counted string in response to termination of a complete count. The pulse initiates operations of a recycling pulse generator, which actuates a discharge tube for the stair step generator and a disabling tube for the multivibrator oscillator.

The 100:1 count is obtained from two cascaded 10:1 counters of the binary type, provided with a resistance matrix for converting a binary count to a decimal count. The gating pulses provided by the counters and matrices are positive and are applied to the grids of output tubes. The cathodes of the output tubes are so normally biased, however, that the tubes do not conduct in response to the positive gating pulses. The output of the comparator is a negative pulse, which is applied in common to all the cathodes of the output tubes. This pulse is of sufficient amplitude to render conductive those output tubes which are, at the time of its occurrence, supplied with a positive gating pulse from the counters. This will occur in respect to one output tube of each counter, i. e. one units tube and one tens tube. Hence two output tubes will fire in response to each negative pulse deriving from the comparator.

The stair step generator employed in the practice of the present invention utilizes a capacity charged step counter, with charging and discharging diodes, and includes a cathode follower for linearizing the charging curve of the capacitor and a further cathode follower for linearizing the first cathode follower.

The recycling pulse generator is a mono-stable multivibrator with a sufficiently long cycle to permit complete discharge of the stair step generator. The output of the recycling pulse generator is applied to a discharge tube, normally biased off but rendered heavily conducting in response to the recycling pulse. A cathode follower is provided in the discharge circuit of the stair step generator, to assure that discharge occurs to precisely the same value of potential, at the end of each cycle of operations.

The disabling tube for the multivibrator is normally non-conducting but is rendered conducting by the recycling pulse, and during its conduction cuts off one section of the multivibrator oscillator. The multivibrator thus always recommences operation in the same phase. The duration of the recycling pulse is consequently not critical, and the only requirement it must meet is that it be sufficiently long to complete discharge of the stair step generator circuit.

It is, accordingly, a broad object of the invention to provide a novel analog to digital converter.

It is a further object of the invention to provide a novel analog to digital computer for operating a recorder of the digital type.

It is another broad object of the invention to provide a novel analog to digital recorder.

It is a more specific object of the invention to provide a novel analog to digital converter wherein a free running oscillator actuates a stair step voltage generator and a commutating counter selects one of a plurality of output channels in accordance with its count at the instant of amplitude coincidence between the stair step voltage and the analog input.

It is another object of the invention to provide a novel analog to digital converter wherein a plurality of output devices are partially gated on in sequence by a counter string, and gating of one of the output devices completed in response to a timed gating pulse applied commonly to all the output devices, in response to amplitude coincidence between an input voltage and a comparison voltage which rises in steps in synchronism with the increase of count of the counter string.

Another object of the invention resides in the provision of a digital recorder in which input is of analog character, the recorder employing stationary styli and electro-sensitive recording tape.

A further and more specific object of the invention is the provision of a digital recorder having a free running oscillator of rectangular pulses, in which the voltage of a stair step generator is advanced one step in response to each rise of a pulse, and a counter string advanced one count in response to each fall, in which a signal voltage of variable magnitude is compared continuously with the stair step voltage and a gating pulse generated on transition of the stair step voltage through the value of the signal voltage, and in which the counter string selects output styli for energization in response to the gating pulse.

The above and still further features, objects and advantages of the invention will become apparent upon consideration of the following detailed description of a specific embodiment thereof, especially when taken in conjunction with the accompanying drawings, wherein.

Figure 1:
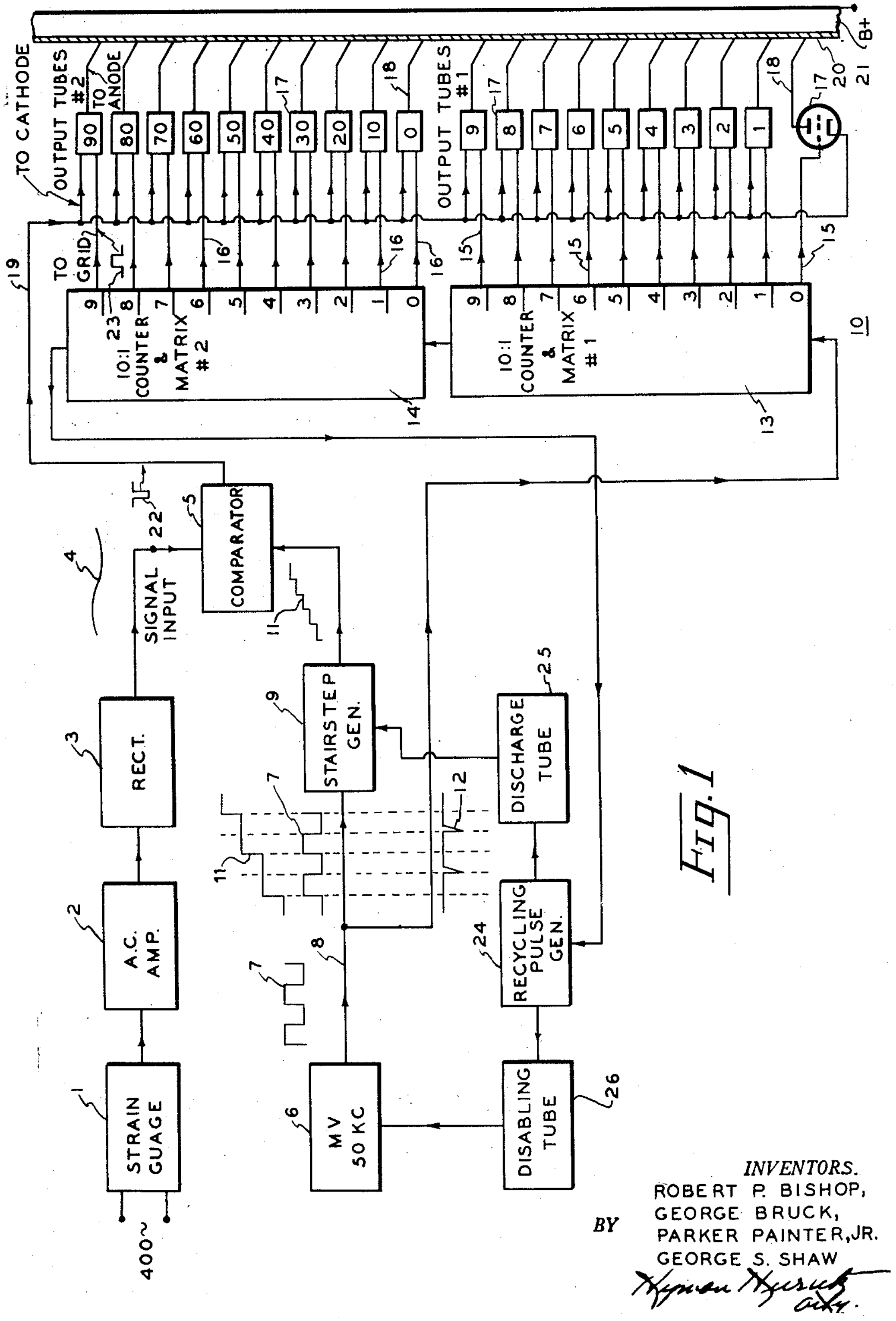
Figure 1 is a functional block diagrams of a specific embodiment of the invention.

Referring now more particularly to Figure 1 of the accompanying drawings, the reference numeral 1 denotes a strain gauge, of conventional character, supplied with 400 C. P. S. signal at its input, and modulating the signal in accordance with the strains imposed. The output of the strain gauge 1 is amplified in an A.-C. amplifier 2 and rectified in a rectifier 3, to provide a D.-C. output signal 4, which may be of varying amplitude. The signal 4 is applied to one input terminal of a comparator 5.

A 50 kc. multivibrator 6, free running, supplies square waves 7 to a lead 8, and from the lead 8 to a stair step generator 9, and the input of a counter string 10. The stair step 11 rises by one step for each complete cycle of output of the multivibrator 6, the rise of each step coinciding with the rise of the multivibrator output. Several steps of the stair wave are indicated at 11, for visual comparison with the square wave 7 supplied by the multivibrator 6, and it is particularly to be noted that the stair step wave rises in response to each rise of the square wave 7, and remains stationary thereafter, until the succeeding rise. The negative pulses 12 indicate that the trailing or negative-going portions of the wave 7 control times of operation of the counter string 10. To this end the counters may be of such character, per se, that they transfer counts in response to trailing edges of square wave pulses, rather than to the rising edges. Counters of this character are known per se.

The counter string 10 consists, in the presently described example of the invention, of two cascaded binary counters, 13 and 14, 13 being a units counters, and 14 a tens counters, which counts 1 for each completion of a count by the counter 13. While the counting circuits are per se, of the binary type, for economy of tubes, and require four tube pairs or flip-flops for each counter, the counters are associated each with an appropriate resistance matrix which transfers from the binary to decimal system, so that ten output channels, 15, exist for the counter 13 and ten output channels 16 for the counter 14. These output channels go to the control grids of vacuum tube devices, as 17. The vacuum tube devices comprise each an anode, connected with one of the recording styli 18, and a cathode, the cathodes being connected in common to a lead 19, which connects with the output of the voltage comparator 5. The styli 18 rest on voltage sensitive recording paper 20, which rests on a conductive platen 21. The latter is connected to a source of B+ voltage, which is thereby connected in common to all the anodes of the tubes 17.

The output of the comparator 5 is a negatively going pulse 22. The counter outputs are positively going pulses 23. The normal bias established for the tubes 17 is such that no tube will fire in response to a pulse 23, alone, applied to a grid, nor in response to a pulse 22 alone, applied to a cathode, but only in response to the coincident application of positive pulse 23 to its grid and a negative pulse 22 to its cathode. Since, at any give time one of leads 15, only, and one of leads 16 only, is supplied with a positive pulse 23, and since all the cathodes are simultaneously supplied with negatively going pulses 22, it will be clear that one output tube of each counter will fire in response to each pulse 22, and that a pair of fired output tubes will represent the tens and units accumulated by counters 13 and 14, at the time of occurrence of pulse 22.

The total voltage rise per step of the wave 11 is 1.5 v., in one specific embodiment of the invention. The maximum value of the wave 11 is thus 150 v. The wave attains this value simultaneously with completion of a count by the counter string 10, and thereafter it is requisite that the stair step generator 9 be discharged, to some predetermined initial value, in readiness for a succeeding cycle of operations. The discharge step consumes time, and during this time it is requisite that the counter chain 10 be idle, and in readiness to recommence counting.

Accordingly, on completion of the last count by the tens counter 14, and on the next succeeding multivibrator pulse, which sets up zero in counter 13, and zero in counter 14, a recycling pulse is transmitted to recycling pulse generator 24. This occurs in response to the trailing edge of the 99th pulse 7, which permits the stair step generator 9 to complete its 99th accumulation, and also permits the comparator 5 to cause the necessary output tubes 17 to fire, if the value of the signal input wave 4 is 150 v.

With the counters set as zero, and the recycling pulse generator 24 actuated, the following events occur. The recycling pulse generator, being a mono-pulse device, generates a relatively long output pulse. This output pulse is applied to a discharge tube 25, which discharges the stair step generator 9, and also to a disabling tube 26, which disables one end of multivibrator 6. Hence, the counting operation ceases, and when the multivibrator is again enabled, it starts in a predetermined phase, i. e. on a rise.

Figure 3:
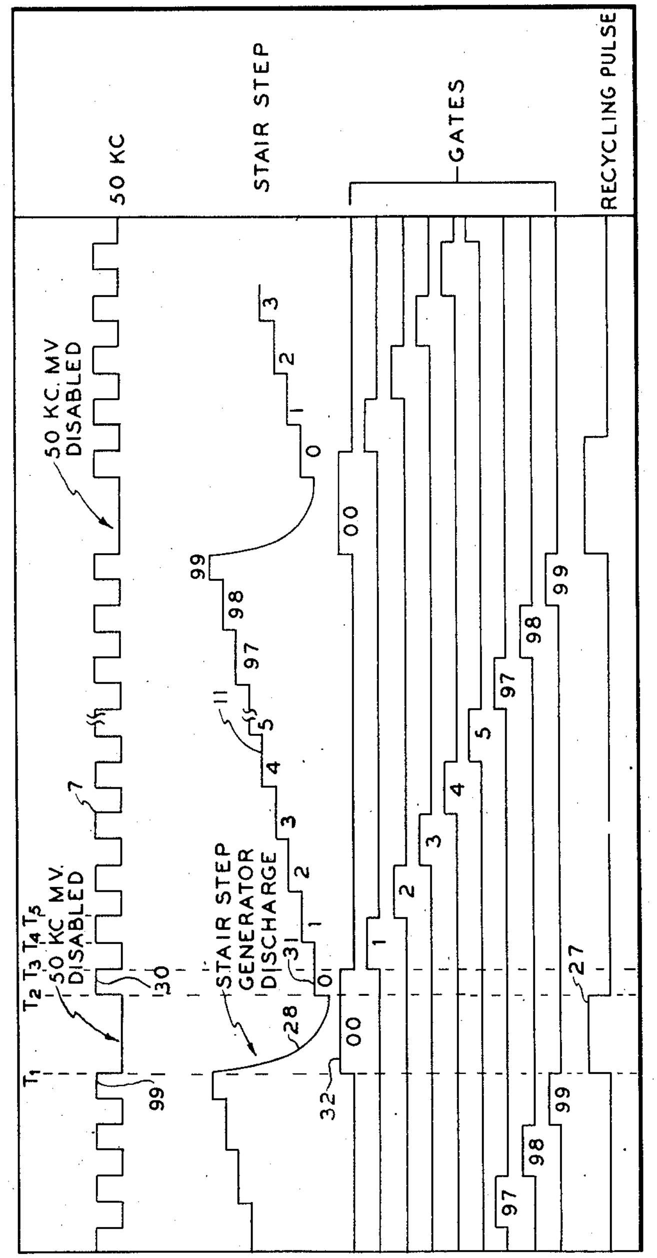
Figure 3 is a timing diagram indicating wave forms in a sequence of operations of the system of Figures 1 and 2.

Turning now to Figure 3 of the accompanying drawings, we may trace through a cycle of events.

At time $T_1$ the 99th pulse 7 has been completed, and the step wave 11 has attained its maximum value, and retained it for ½ cycle of wave 7. At this time, and in response to the trailing edge of the 99th positive half cycle, the counters are reset to zero, and the recycling pulse 27 initiated. The duration of the recycling pulse 27, is sufficient to enable complete discharge of the stair step generator, indicated at 28.

When the disabling pulse 27 ceases, the multivibrator starts with count 1, at 30. This represents time $T_2$. When the first multivibrator pulse 30 rises, there is a concurrent rise of the stair step generator to its zero value, at 31. The counter is still set at zero, since the first count does not commence until positive pulse 30 terminates, and the condition of the counter is indicated by gating pulse 32. Hence, in this condition the counter reads zero, and the stair step is at 1½ v., or has taken its first step. The counter remains in this condition until time $T_3$, and between times $T_2$ and $T_3$ a comparison must be effected by comparator 15.

Figure 2:
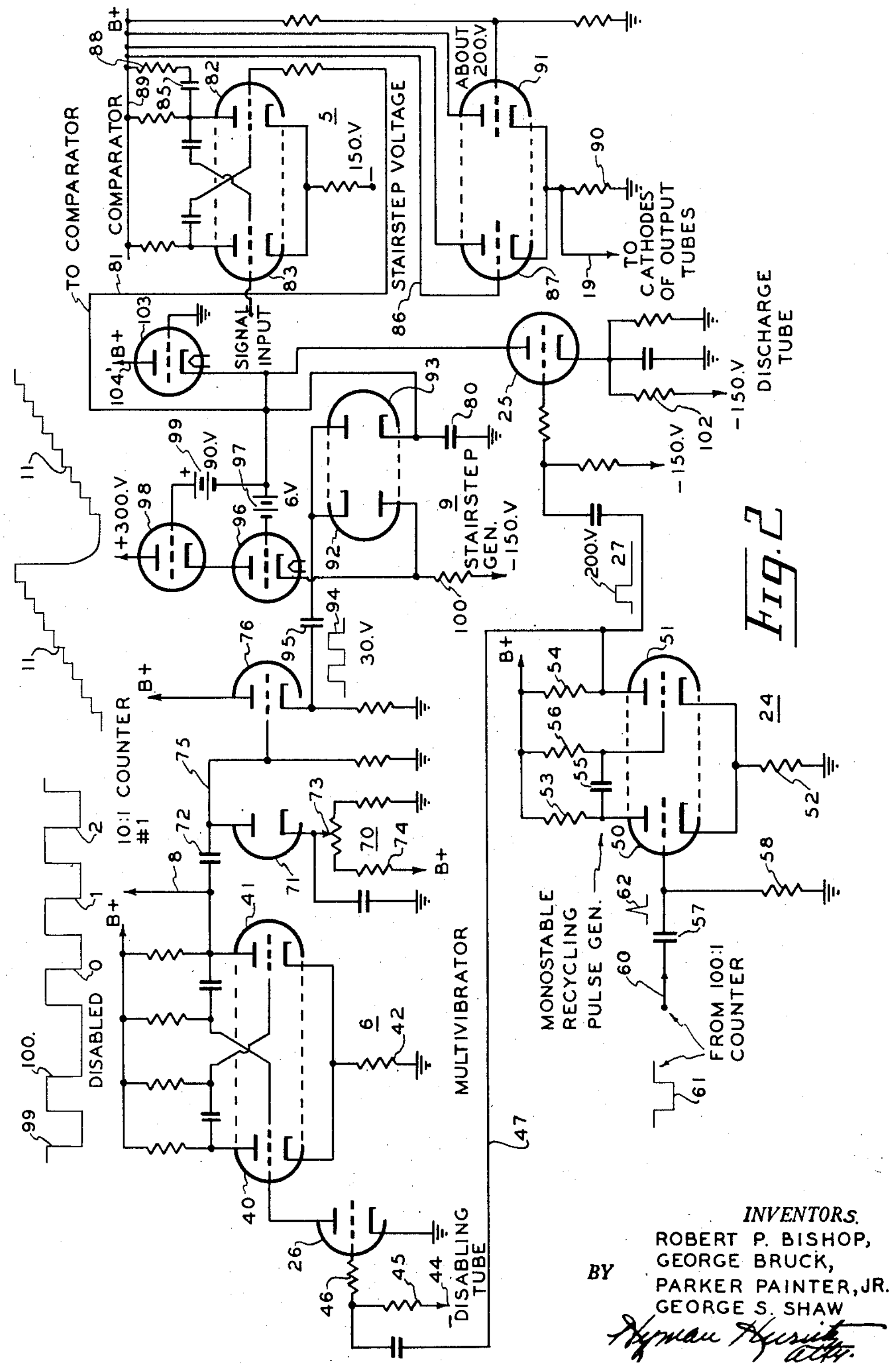
Figure 2 is a schematic circuit diagram of elements of Figure 1.

Referring now more specifically to Figure 2 of the accompanying drawings, the multivibrator 6, comprises two triode tubes, 40, 41, having a common cathode resistor 42, and capacitive coupling, from the grid of each tube to the anode of the other. The multivibrator 6 is per se conventional, and operates in conventional fashion, and hence detailed description of its circuit and mode of operation is dispensed with.

Lead 8 is connected with the anode of tube 41, to derive square wave output pulses thereon, and lead 8 is connected with the input to the counter string 10. A disabling triode 26 is connected with its anode to the grid of triode 40, and with its cathode to ground. Bias is supplied to the grid of triode 26, via terminal 44, and resistances 45, 46 in series, of sufficient magnitude to maintain triode 26 normally cut-off. Accordingly, triode 26 has normally no effect on the multivibrator 40, and the latter is free running.

The triode 26 is a disabling tube for the multivibrator 6, and accomplishes the function by effectively grounding the grid of triode 40, in response to a positive disabling pulse 27 of considerable magnitude applied to its own grid. The disabling pulse is applied via lead 47, and may have a magnitude of the order of 200 v., for example. The internal impedance of triode 26 is reduced to a very low magintude, by the disabling pulse, so that the grid of triode 40 is reduced in potential substantially to ground level. The cathode of triode 40 is considerably above ground, due to the cathode resistance 42. Accordingly, in the presence of the disabling pulse, triode 40 becomes non-conductive, and oscillations of multivibrator 6 cease.

The disabling pulse supplied on lead 47 derives from a monostable recycling pulse generator 24, which is per se conventional, and consists of two intercoupled triode tubes 50, 51, having a common cathode resistance 52. Plate resistance leads 53, 54, are inserted in series, respectively, between a B+ supply terminal and the anodes of the triodes 50, 51. The anode of triode 50 is coupled to the grid of triode 51 via a condenser 55, and the grid of triode 51 is further connected to the B+ supply terminal via a resistance 56. The triode 51 is thus normally conductive, and its anode voltage is relatively low. The triode 50 is driven via an RC differentiating network, comprising condenser 57 and resistance 58. Triode 50 is normally non-conducting, because of the bias supplied by cathode resistance 52, so that its anode is at relatively high potential. The signal supplied to input lead 60 corresponds with the output of counter string 10, and constitutes a negatively going pulse 61 of considerable duration.

The differentiating circuit 57, 58, translates the leading edge of the negative pulse 61 into a short negative pip, which has no effect on triode 50, since the latter is in any case non-conductive or nearly so. The trailing edge of the negative pulse 61 is transformed by differentiating circuit 57, into a relatively high positive pip, 62, which reduces the voltage at the anode of triode 50. This reduction of anode potential is communicated to the grid of triode 51, via coupling condenser 55, and raises the potential of the anode of triode 51. The rise in potential constitutes the outgoing disabling pulse 27, which, moreover, endures for a considerable period, determined by the time constants of the mono-stable recycling pulse generator 24.

When the recycling pulse 27 ceases, the tube 43 becomes non-conductive, and the multivibrator 6 commences oscillating. During the recycling pulse the counter is set at zero. The first half cycle 30 of the multivibrator 6 is always positive, and sets the stair step generator 9 at its first step. Termination of the first half cycle 30 is accompanied by an increase in count to 1. The cycle of events then repeats.

The positive pulses outgoing from multivibrator 6 are clipped in a clipper 70, comprised of a diode 71 having its anode coupled via condenser 72 to the anode of tube 41 of multivibrator 6. The cathode of diode 71 is biased positively by virtue of a variable tap 73 of a potentiometer 74, one input terminal of which is grounded, and the other connected to a B+ source. The amplitude of pulses appearing on lead 75 is equal to the voltage available at tap 73, the diode 71 providing a shunt path for positive voltages in excess of its cathode potential. The pulses available on lead 75 are applied to the input of a cathode follower 76, and taken from the cathode load 77 of the cathode follower 76 at a potential with respect to ground of 30 v.

These pulses are accumulated by stair step generator 9, in condenser 80 thereof, and the voltage on condenser 80 is applied via lead 81 to the control grid of a triode 82. The triode 82 is cross-connected with a further triode 83, to provide a bi-stable multi-vibrator, the voltage to be measured being applied to the control grid of triode 83. This multivibrator is in fact the comparator 5.

At the start of a cycle of counts the voltage on the grid of tube 82 is low. The voltage on the grid of tube 83 may have any value from 1.5 to 150 v., and in any event is higher than the voltage on the grid of triode 82. Accordingly, the signal on triode 83 maintains that triode conductive, at the initiation of a cycle of events. The triode 82 is then non-conductive.

As the voltage on the lead 81 rises, eventually, and during one of its rises, it becomes larger than the instantaneous voltage input to the control grid of triode 83. At that instant the comparator 5, constituted of a bi-stable multivibrator, assumes its alternate stable condition, i. e. triode 82 becomes conductive, and triode 83 non-conductive. The transition is extremely rapid, because of the regeneration existent in the multivibrator, and a very short fall of voltage takes place at the anode of the triode 82 at the time of the transition, and in response thereto.

The anode of triode 82 is coupled via condenser 85 and lead 86 to the control electrode of a triode 87. This control electrode is further connected via lead 86 and resistor 88 to B+ lead 89. The triode 87 is connected as a cathode follower, having a cathode load 90. It follows that the triode 87 is normally conducting and that its cathode is positive with respect to ground. The cathode load is further supplied with current by a triode 91, being connected in the cathode circuit thereof. The triode 91 operates with its anode directly connected to B+ lead 89, and with its grid connected to an intermediate positive voltage, via the mid-point of a potentiometer consisting of two fixed resistances 92, 93, connected from B+ lead 98 to ground. The triode 91 is not subjected to signal, but constitutes a stabilizer for the triode 87.

When the triode 82 becomes conductive, in response to coincidence between the amplitude of the stair step voltage 11 and the voltage being measured, a negative pulse is applied via condenser 85 to the control grid of triode 87, reducing the voltage across resistance 90. This reduction of voltage is communicated to lead 19, which is connected to the cathodes of the output tubes, as 17.

The voltage across cathode load 90 constitutes, then, the firing gate for the output tubes, hereinbefore described, and which fires all the output tubes to be rendered fully conductive. These latter are, however, supplied with partial gating voltage at their grids, selectively, by the counters 13, 14, so that one of the output tubes 17 associated with counter and matrix 13 fires, and one of the tubes associated with counter and matrix 14.

It will be noted that the counters 13, 14 transfer counts at the end of each positive pulse, deriving from the multivibrator 6, and that consequently each count endures from the beginning of a space to the termination of a positive pulse. The stair step generator 9, on the other hand, effects a transition of level at the commencement of a positive pulse, and it is at this instant that the comparator 5 operates. It will be clear, then, that the sequence of events is (1) the counters transfer count, say at time $T_3$, and then have one half cycle, at 50 k. c., the frequency of multivibrator 6, to assume stable condition. (2) At the termination of this half cycle, i. e. at $T_4$, the stair step voltage 11 advances, and at this time an amplitude comparison is effected by comparator 5, and output tubes 17 fire, and recording takes place if the transition of voltage of the stair step 11 passes through the instantaneous value of the voltage desired to be recorded. The system then has until time $T_5$ to recondition itself for the succeeding counter transfer and comparison.

Turning now to the stair-step generator 9, it is comprised essentially of a pair of back to back diodes 92, 93, of which the diode 93 includes, in its cathode to ground circuit, the charging condenser 80 across which appears the desired stair-step voltage. The output of cathode follower 76, constituted of a 30 volt square wave 94, is applied to the anode of diode 93 via a relatively small condenser 95, the relative capacities of condensers 80 and 95 being such that 1.5 volts appear across condenser 80 in response to a 30 volt pulse applied across condensers 95, 80 in series. Upon cessation of each charging pulse the charge contained in condenser 80 is unable to leak off via the diode 93, and successive charges accordingly build up a stair-step voltage across condenser 80.

A stair-step voltage generator comprising only diodes 92, 93, and the required charging condensers, is essentially non-linear, for the reason that the net voltage applied to condensers 95 and 80, in series, is the voltage of pulse 94 less the voltage existent on condenser 80. This net voltage constantly decreases as the voltage across condenser 80 increases.

In order to render equal all the steps of the stair-step voltage available across condenser 80, it is essential that the voltage at the anode of the diode 92 remain at all times equal to the voltage at the cathode of diode 93. Thereby, condenser 95, instead of discharging to ground potential in the interval between pulses 94, will discharge to the potential of the cathode of diode 93. The pulses 94 will then be superposed on this voltage, and the net voltage available to charge condenser 80 will always be 30 volts.

To accomplish the linearizing function indicated in the preceding paragraph, the anode of diode 92 is connected to the cathode of a cathode follower triode 96, and the grid of triode 96 is connected to the cathode of diode 93, in series with a compensating bias source 97, of suitable value. Thereby, the cathode of triode 96 may be maintained at a potential equal to that at the undergrounded plate of condenser 80. This relationship is maintained so long as cathode follower tube 96 operates linearly. In order to linearize the operation of cathode follower tube 96, the tube 96 itself is connected as a cathode follower load for a further triode 98, having a grid which is biased heavily positive by means of bias source 99. The cathode load 100, for triode 96, is connected to a source of negative voltage, in order that the cathode of triode 96 shall be at ground potential in the absence of voltage on condenser 80.

At the end of a cycle of counting, as has been explained hereinbefore, the condenser 80 must be discharged in readiness for a further cycle. The discharge is accomplished in response to pulse 27, and it is essential that the condenser 80 be discharged to an accurately predetermined value, generally ground potential. The discharge device is a triode 25, having its anode connected directly to the cathode of diode 93, and having a suitable cathode load 102 in series with a source of negative potential. The grid of the triode 25 is biased negatively to this same potential, so that the triode 25 is normally in cut-off condition. In response to pulses 27, however, the triode 101 conducts heavily, and its anode then goes to ground potential. To stabilize the operation of triode 25 its anode to cathode circuit is connected as the cathode load of a triode 103, having a B+ source 104. Variations of B+ voltage are thereby not reflected as variations of anode voltage at triode 101, and the discharge condition of condenser 80 is not dependent on variations of B+ voltage within the system.

While we have described and illustrated a preferred specific embodiment of our invention, as required by the statutes relating to Letters Patent of the United States, it will be clear that variations of general arrangement and of details of construction and circuitry may be resorted to without departing from the true spirit of the invention as defined in the appended claims.

What I claim is:

1. A quantizing recorder, comprising a source of variable voltage the magnitude of which is to be recorded, a source of linear stair step voltage, a counter, a source of alternating rectangular wave voltage of frequency high relative to the variations of said variable voltage, means for advancing the count of said counter by one step in response to each cycle of said alternating rectangular wave voltage, an amplitude comparator having means for generating a gating pulse in response to coincidence of magnitude of said variable voltage and said stair step voltage, and multiple stylus recorder means responsive to said gating pulse for recording the then count of said counters.

2. The combination in accordance with claim 1 wherein said means for recording includes a plurality of fixed styli arranged in spaced relation along one side of a voltage sensitive recording tape, a platen arranged in proximity to said styli on the other side of said tape, a gaseous conduction device in series with each of said styli, each of said gaseous conduction devices having a cathode and a grid, means for raising the voltage of said grids selectively in accordance with the count of said counter, and means for lowering the voltage of all the cathodes of said gaseous conduction devices in response to said gating pulse.

3. The combination in accordance with claim 1 wherein said means for recording includes a plurality of fixed styli arranged in spaced relation along a voltage sensitive recording tape, a unilateral conduction device in series with each of said styli, means for selectively conditioning said unilateral conduction devices for conduction in response to the count of said counter, and means for effecting conduction of the conditioned unilateral conduction devices in response to said gating pulse.

4. A quantizing recorder for recording in quantized relation the magnitude of a source of variable voltages, a linear stair step voltage generator, a counter, a generator of periodic pulses having each a rise followed by a fall followed by a space, means for actuating said stair step generator to advance one step in response to each rise, means for advancing the count of said counter in response to each fall, an amplitude comparator having means for generating a gating pulse in response to coincidence of magnitude of said variable voltage and said stair step voltage, and means responsive to said gating pulse for recording the then count of said counter.

5. A quantizer, comprising an input channel for a voltage the magnitude of which is to be quantized, a linear stair step voltage generator, a counter, a periodic pulse generator, means for actuating said stair step voltage generator to advance one step in response to each rise of said periodic pulse, means for actuating said counter to advance one step in response to termination of each of said periodic pulses, an amplitude comparator comprising means for generating a gating pulse in response to coincidence of magnitudes of said variable voltage and said stair step voltage, a plurality of output channels selectively partially gated in response to and in accordance with the count of said counter, and means responsive to said gating pulse for completing gating of said output channels selected in response to and in accordance with the count of said counter.

6. A quantizer, comprising, an input channel, a plurality of output channels, and means for selecting one of said output channels in accordance with the magnitude of a voltage in said input channel, said means including a periodic pulse generator, a first counter having cascaded bi-stable flip-flop circuits the conditions of stability of which represent a count, means for selectively partially gating on said output channels in accordance with the count of said counter, a second counter, means for advancing the count of said second counter, a comparator for comparing the magnitude of said voltage with the count of said second counter, and means responsive to coincidence of the magnitude of said voltage with the count of said second counter for fully gating on the selectively partially gated on output channel.

7. A quantizer, comprising an input channel carrying a variable voltage to be quantized, a source of periodic pulses, a stair step voltage generator, a counter responsive to the trailing edges of said pulses for adding counts, and having a minimum and a maximum count, a stair step generator comprising a charging capacitor responsive to the leading edges of said pulses for adding steps to said stair step voltage in terms of charge on said capacitor, a comparator for comparing said variable voltage with said stair step voltage and generating a control pulse in response to coincidence of said voltages, a plurality of output channels, means responsive to said control pulse for selecting at least one of said output channels in accordance with the count of said counter at the time of said control pulse, and means responsive to transition of said counter from maximum to minimum count for discharging said condenser and for disabling said source of periodic pulses during said discharge.

8. The combination in accordance with claim 7 wherein said means for disabling is timed to disable said source of periodic pulses only on a trailing edge of one of said pulses.

9. A quantizing recorder for recording in quantized fashion the magnitude of a variable voltage on voltage sensitive recording paper, comprising a plurality of stationary recording styli superposed in spaced relation on said paper, a source of periodic high frequency pulses, an electronic counter for counting said pulses and responsive to the trailing edge of each of said pulses for advancing the counter by one count, a stair step voltage generator responsive to the leading edge of each of said periodic pulses for advancing said stair step voltage by one step, an amplitude comparator for comparing the amplitudes of said stair step voltage and of said variable voltage and for generating a control pulse in response to coincidence of said voltages, output devices for energizing said styli, and means for selectively actuating said output devices in response to said control pulse to actuate at least one of said styli selected in accordance with the count of said counter.

10. The combination in accordance with claim 9 wherein said output devices require at least two coincident control voltages to actuate a stylus, and wherein said counter supplies at least one of said two coincident control voltages selectively to said output devices in accordance with the count of said counter, and wherein said control pulse is another of said at least two coincident control voltages.

11. The combination in accordance with claim 10 wherein said output devices are gaseous conduction devices.

References Cited in the file of this patent

UNITED STATES PATENTS

| | | |
|---|---|---|
| 2,213,886 | Potter | Sept. 3, 1940 |
| 2,303,472 | Johnston | Dec. 1, 1942 |
| 2,496,338 | Barton | Feb. 7, 1950 |
| 2,498,688 | Lesti | Feb. 28, 1950 |
| 2,543,736 | Trevor | Feb. 27, 1951 |
| 2,563,123 | Luck | Aug. 7, 1951 |